No. 835,232. PATENTED NOV. 6, 1906.
F. E. BACHMAN.
METHOD OF AGGLOMERATING FINE ORES.
APPLICATION FILED JAN. 31, 1906.
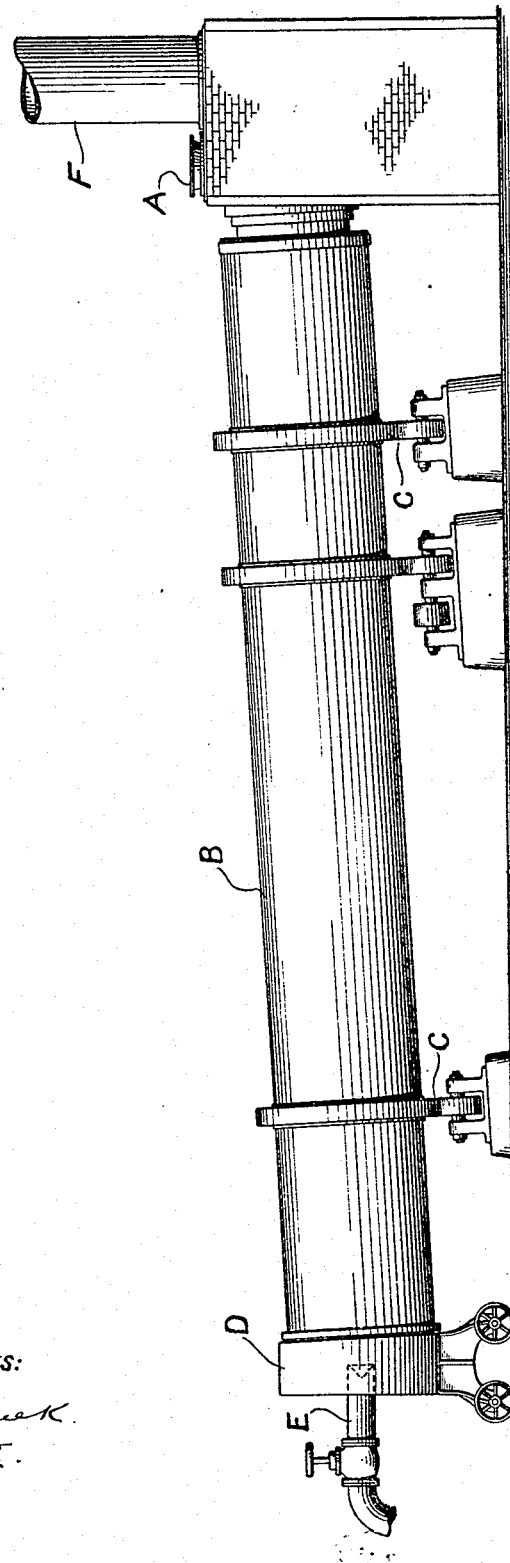

UNITED STATES PATENT OFFICE.

FRANK E. BACHMAN, OF PORT HENRY, NEW YORK, ASSIGNOR TO NORTHERN IRON COMPANY, OF PORT HENRY, NEW YORK, A CORPORATION OF NEW YORK.

METHOD OF AGGLOMERATING FINE ORES.

No. 835,232.  Specification of Letters Patent.  Patented Nov. 6, 1906.

Application filed January 31, 1906. Serial No. 298,756.

*To all whom it may concern:*

Be it known that I, FRANK E. BACHMAN, a citizen of the United States, residing at Port Henry, in the county of Essex and State of New York, have invented a Method of Agglomerating Fine Ores, of which the following is a specification.

This invention relates to agglomerating fine iron ores, as also flue-dust or the like, so as to fit them for use in the blast-furnace, and it contemplates mixing such materials with a sufficient quantity of coke-braize, waste charcoal, or other inexpensive carbonaceous matter to provide heat and ash for effecting the agglomeration in a rotary kiln with the use of a flame of low calorific power.

The leading objects of the invention are to reduce the cost of operation and to avoid the use of high temperatures, such as have commonly been employed, which fuse the ores and cause them to adhere to and injure the kiln-lining.

The objects are attained by the mode of operation described through the fact that the ash produced from the fuel mixed with the iron-bearing materials binds such materials together at a lower temperature than is required to cause them to clinker by fusing them. The solid carbonaceous matter used for producing the ash and providing heat may be a waste product, and the flame used for carrying on the combustion may be of economical character, such as produced by blast-furnace gas alone or mixed with a small amount of oil or pulverized coal.

The mode of operation may be practiced by the apparatus shown in the accompanying drawing, which represents a side elevation of a rotary kiln having means for introducing the ore mixed with solid carbonaceous matter at one end and a flame at the other.

Referring to the drawing, in carrying on the operations, the mixture of fine iron-bearing materials and carbonaceous matter is charged through the hopper A, whence it is fed continuously through the kiln B, which rotates on the bearings C D and is inclined downwardly, so as to cause the materials to travel at a gradual rate therethrough. As the materials are agitated and carried through the kiln they are subjected to the action of a flame passing in the opposite direction, which is introduced by means of the burner E, and the waste gases are carried off through the stack F.

The flame introduced by means of the burner ignites the carbonaceous matter mixed with the ore, and the combustion raises the temperature of the ore to a point, preferably below fusion, at which the ash produced from the carbonaceous matter will fuse, adhere, and effect the agglomeration of the ore.

The coke-braize or other solid carbonaceous matter supplies part of the heat necessary, and the flame produces the additional heat required for fusing the ash and binding the iron-bearing materials to form nodules.

It is to be understood that iron ores fuse at about 2,300° Fahrenheit, while blast-furnace gas is capable of producing a temperature of about 2,200° Fahrenheit, providing both a cheap and suitable means for carrying on the combustion of fuel mixed with the ore and providing the temperature desired.

The heat produced by the blast-furnace gas preferably or producer-gas may also be supplemented by mixing with such gas either powdered coal or oil in such quantity as may be required to produce the desired temperature for carrying on the operations, by which there is obtained a more economical flame and one of lower temperature than results from the combustion of either oil or powdered coal alone.

Having described my invention, I claim—

1. The method of agglomerating fine ores, flue-dust or the like which consists in mixing the same with sufficient carbonaceous material to supply the ash necessary for effecting the agglomeration, passing the same through a rotary kiln subject to the action of a flame and heating to a temperature below that required for fusing the ores.

2. The method of agglomerating fine ore, which consists in mixing the same with sufficient carbonaceous material to provide heat and the necessary ash to effect agglomeration, feeding said mixture through a rotary kiln and subjecting the same to a flame of such power as to effect the combustion of the carbonaceous material and the fusion of its ash and agglomeration without fusing the ore.

3. The method of agglomerating fine iron ores, flue-dust or the like which consists in mixing the same with sufficient coke-braize to supply heat and ash sufficient for bending and passing the same through a rotary kiln subject to the action of a flame produced from blast-furnace gas.

4. The method of agglomerating fine ores, flue-dust and the like which consists in feeding the same through a rotary kiln, subjecting it to a temperature below that which will effect fusion of the ore, and effecting agglomeration by foreign matter mixed with the ore which fuses and adheres at said temperature.

5. The method of agglomerating fine ores, flue-dust and the like which consists in feeding the same through a rotary kiln, subjecting it to a temperature below that which will effect fusion of the ore, and effecting agglomeration by combustible matter mixed with the ore whose ash fuses and adheres at said temperature.

6. The method of agglomerating fine ores, flue-dust and the like which consists in feeding the same through a rotary kiln, subjecting it to the action of a flame employing blast-furnace gas, and effecting agglomeration by foreign matter which fuses and adheres under the action of said flame.

7. The method of agglomerating fine ores, flue-dust and the like which consists in feeding the same through a rotary kiln, subjecting it to the action of a flame produced by blast-furnace gas and a fuel of different power and effecting agglomeration by foreign matter which fuses and adheres under the action of said flame.

In testimony whereof I have hereunto set my hand, this 23d day of January, A. D. 1906, in the presence of the subscribing witnesses.

FRANK E. BACHMAN.

Witnesses:
   FRED W. DUDLEY,
   CHARLES JOHNSON.